United States Patent [19]

Shaw

[11] 4,376,595

[45] Mar. 15, 1983

[54] MONOLITHIC WATER-PERMEABLE CONCRETE ROADWAY AND RELATED LARGE AREA STRUCTURES WITH INTEGRAL DRAINAGE ELEMENTS

[76] Inventor: Arthur Shaw, 101 Stock Isle Apts., Key West, Fla. 33040

[21] Appl. No.: 176,514

[22] Filed: Aug. 8, 1980

[51] Int. Cl.³ .............................................. E01C 1/00
[52] U.S. Cl. ..................................... 404/17; 404/36; 404/72; 404/4; 52/612; 106/98; 272/3
[58] Field of Search .............. 404/36, 31, 17, 4, 73, 404/1, 2, 7, 6; 106/86, 90, 308, 98; 52/612, 408, 410; 272/3

[56] References Cited

U.S. PATENT DOCUMENTS

| | | | |
|---|---|---|---|
| 511,870 | 1/1894 | Winter | 404/2 |
| 792,873 | 6/1905 | Amies | 404/87 |
| 845,910 | 3/1907 | Walter | 404/81 |
| 1,253,600 | 1/1918 | Johnson | 404/73 X |
| 1,355,833 | 10/1920 | Howe | 404/2 |
| 1,456,080 | 5/1923 | Trebes | 404/73 |
| 1,690,059 | 10/1928 | Eilers | 404/81 |
| 1,717,445 | 6/1929 | Flood | 404/81 X |
| 1,918,155 | 7/1933 | Wallace | 404/81 |
| 1,934,689 | 11/1933 | Andrews | 404/81 X |
| 2,157,330 | 5/1939 | Fleckenstein | 404/81 |
| 2,225,186 | 12/1940 | Sorensen | 404/1 |
| 2,515,847 | 7/1950 | Winkler | 404/2 X |
| 2,793,957 | 5/1957 | Mangold | 106/86 |
| 2,837,984 | 6/1958 | Klotz | 404/2 |
| 3,439,450 | 4/1969 | Richards | 47/9 |
| 3,512,327 | 5/1970 | Lapadura | 52/612 |
| 3,687,021 | 8/1972 | Hensley | 404/81 X |
| 3,690,227 | 9/1972 | Welty | 404/2 |
| 3,807,699 | 4/1974 | France | 404/6 X |
| 3,847,630 | 11/1974 | Compernass | 106/90 |
| 3,870,422 | 3/1975 | Medico | 404/31 |
| 4,082,562 | 4/1978 | Litvan | 106/97 |
| 4,095,995 | 6/1978 | Ullrich | 106/308 |
| 4,259,824 | 4/1981 | Lopez | 52/612 |

FOREIGN PATENT DOCUMENTS 107549 7/1917 United Kingdom ................. 404/81

Primary Examiner—Nile C. Byers, Jr.
Attorney, Agent, or Firm—Weingarten, Schurgin, Gagnebin & Hayes

[57] ABSTRACT

Large area concrete structures, such as roadways, parking lots and playing field bases are monolithically cast with integral drainage elements using an especially formulated water-permeable concrete material having strength and durability to conventional concrete. Such structure provide minimal interference with natural water flow patterns, optimal use of available land, and minimal harm to adjacent vegetation.

12 Claims, 4 Drawing Figures

MONOLITHIC WATER-PERMEABLE CONCRETE ROADWAY AND RELATED LARGE AREA STRUCTURES WITH INTEGRAL DRAINAGE ELEMENTS

FIELD OF THE INVENTION

This invention relates to improved large area concrete structures such as roadways, parking lots and the like. In particular, it relates to monolithic large area concrete structures having integral drainage elements.

BACKGROUND OF THE INVENTION

The need for water-permeable large area structures is substantial. By large area structure is meant a structure of sufficient area to substantially interfere with the natural drainage patterns in a typical one block area. Typically, any structure covering more than about 400 square yards can cause such interference.

As construction with conventional, water-impermeable concrete has increasingly covered the natural flood plain in urban and suburban areas with large area roadways, parking lots and plazas, the capacity of these flood plains to absorb water has been greatly reduced, aggravating problems of flood and pollution control.

In addition, when proper drainage is given adequate consideration, conventional water-impermeable concrete structures are complex to build and highly inefficient. Conventional concrete roadways, for example, must be constructed as composite structures including one or more layers of loose aggregate under the concrete to permit water to drain across the roadway. In addition, such roadways typically require the digging of drainage ditches and the placement of tiles at frequent points. Moreover, such structures must often be provided with a convex grade to facilitate the flow of water from the surface. Other large area structures, such as parking lots, also present similar drainage problems and often seriously alter the natural drainage patterns throughout the surrounding area.

Accordingly, there is a need for large area concrete structures adapted in configuration and composition for monolithic casting with integral drainage elements.

SUMMARY OF THE INVENTION

In accordance with the present invention, large area structures, such as roadways, parking lots and playing field bases are monolithically cast with integral drainage elements using an especially formulated water-permeable concrete material having strength and durability comparable to conventional concrete. Such structures provide minimal interference with natural water flow patterns, optimal use of available land, and minimal harm to adjacent vegetation.

BRIEF DESCRIPTION OF THE DRAWINGS

The nature, advantages and various features of the invention will appear more fully upon consideration of the illustrative embodiments now to be described in detail in connection with the accompanying drawings.

In the drawings.

DETAILED DESCRIPTION OF THE DRAWINGS

Figure 1:
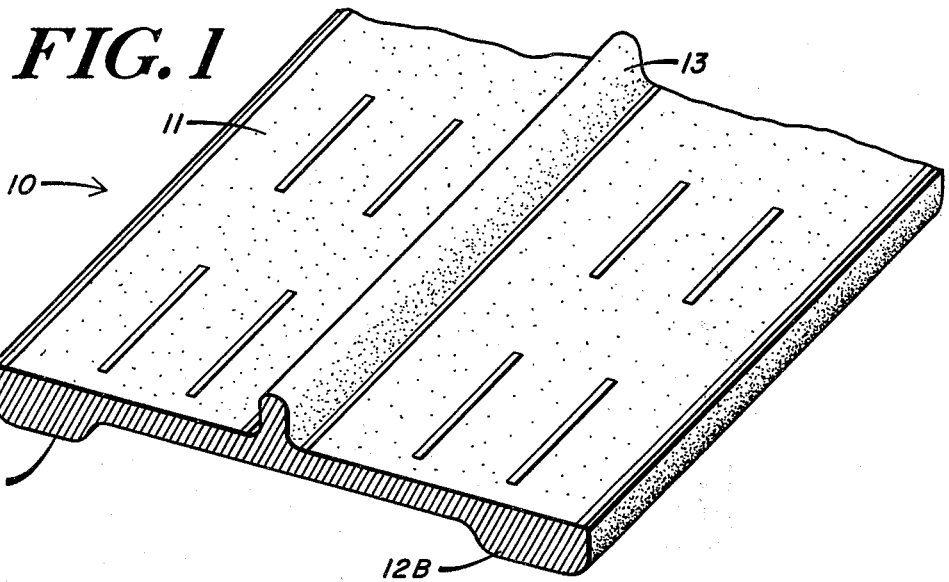
FIG. 1 is a perspective view in partial cross-section of a monolithic roadway having integral drainage areas in accordance with the invention.

Referring to the drawings, FIG. 1 is a perspective view in partial cross-section of a monolithic roadway having integral drainage elements in accordance with the invention. In essence, the roadway comprises an elongated structure 10 of water-permeable concrete having a generally flat upper surface 11 and a thickness and width suitable for supporting and accommodating vehicular traffic. On either side of the roadway are longitudinally extending integral drain elements 12A and 12B of enlarged thickness as compared to the average thickness of the structure. Specifically, the drain elements should be at least 50% thicker than the non-drain areas and preferably at least twice as thick. An integral lane divider 13 can optionally be cast on the upper surface. Unlike conventional roads which require a graded upper surface for water runoff the upper surface of this road can be substantially planar.

In typical application, the upper surface is on the order of six traffic lanes wide and has a minimal thickness of about eight inches in the non-drain areas and twelve inches in the drain areas. Each drain element is preferably about one lane wide. The divider is about one foot thick and three to four feet high.

Figure 2:
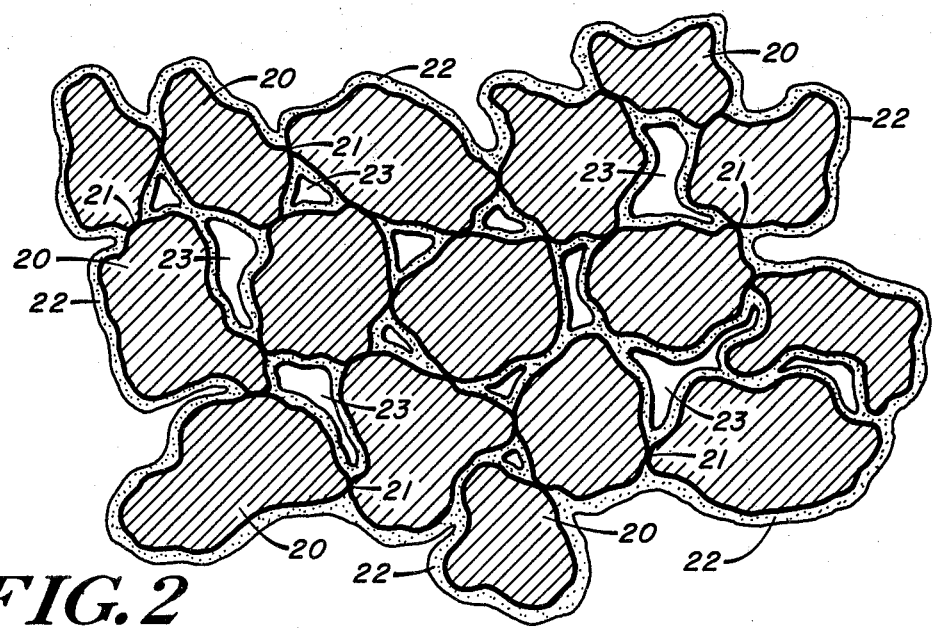
FIG. 2 is an enlarged schematic cross section of the preferred porous concrete useful in making the roadway of FIG. 1.

The roadway of the invention is constructed of water-permeable concrete of the type illustrated in FIG. 2 comprising plural elements 20 of a coarse aggregate cemented together at points of contact 21 by a thin layer of cement 22 leaving relatively large voids 23 between adjacent aggregate elements. By water-permeable concrete is meant a concrete having a water permeability in excess of about ½ inch of water per minute per unit area.

A preferred composition and method for making such a permeable concrete involves the steps of forming an aqueous suspension of finely-divided silicon dioxide, sizing a coarse aggregate in the suspension, adding cement, and pouring, casting and curing the resulting mixture. Specifically, an aqueous suspension of finely divided silicon dioxide is formed by adding the silicon dioxide, typically 100 mesh or finer, to water in a cement mixer and mixing until the silicon dioxide particles are uniformly suspended. The water can be either fresh water or salt water, such as sea water. A coarse aggregate, typically ⅛–¼ inch gravel, is then added to the suspension and mixed therein until the elements of the aggregate are sized with a coating of silicon dioxide. Cement, such as Portland cement, is added to the mixer and the mixing is continued until the sized elements of aggregate are thoroughly coated with cement. The resulting mixture is then poured, cast and cured in the conventional manner.

While the precise relationship is not known, in general the more uniform in size the aggregate, the greater the degree of water permeability of the resulting concrete.

In a preferred composition, for each cubic yard of coarse aggregate (e.g. ¼ inch gravel), 15–20 pounds of silicon dioxide (e.g. 300 mesh) is suspended in 16–20 gallons of water wherein the aggregate is sized. About four bags of Portland cement (96 pounds per bag) is mixed with the sized aggregate.

Alternatively, for heavy duty roads, 20–22 pounds of silicon dioxide is suspended in 18–22 gallons of water, and five bags of Portland Cement is mixed with the sized aggregate.

The advantages of road constructions in accordance with the invention are manyfold. Because of the porous nature of the material, the road can be cast as one monolithic structure, simultaneously forming drainage elements for performing the functions of the conventional loose aggregate underlayment, conventional drainage ditches and conventional grading. The road utilizes the natural absorption of the underlying soil and has a minimal effect on the natural flow paths and adjacent vegetation. The road surface need not be graded to provide runoff, and the surface provides especially effective traction in rain or cold weather because rainwater and melted ice water are quickly absorbed through the road surface. In addition, because of its porous nature, the surface can be readily and durably patched.

Figure 3:
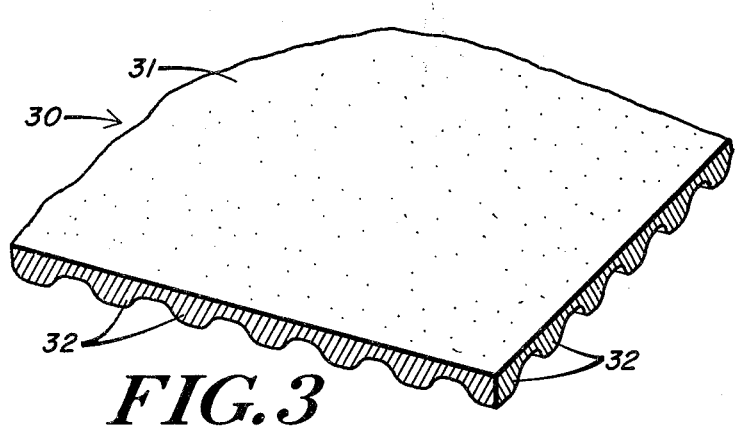
FIG. 3 is a perspective view in partial cross-section of a monolithic parking lot in accordance with the invention.

FIG. 3 illustrates an alternative form of a large area monolithic structure with integral drainage elements particularly usful as a parking lot, plaza, or as a base for an artifiial playing field. The large area monolithic structure 30 comprises a layer of concrete having a generally flat uper surface 31, of a thickness for supporting vehicula and human traffic, and a plurality of integral drain areas 32 of enlarged thickness as compared to the non-drain areas. Conveniently the integral drain areas can extend over substantially the entire area of the structure in mutually perpendicular directions defining a drainage grid. Preferably the drain elements are at least twice as thick as the remaining portions and cover approximately one third of the total area. The structure has substantially the same advantages as the roadway described above.

Unlike corresponding conventional structures which are usually graded, the upper surface of this structure can be substantially planar.

In a preferred composition, for each cubic yard of coarse aggregate, 10–15 pounds of silicon dioxide is suspended in about 12 gallons of water, and about 2½ bags of Portland cement is mixed with the aggregate after sizing.

Figure 4:
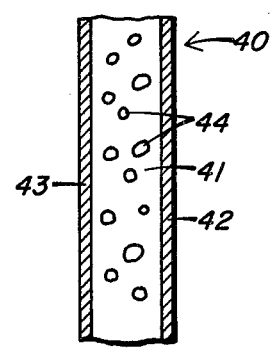
FIG. 4 is a cross-sectional view of an insulating concrete wall in accordance with the invention.

FIG. 4 illustrates an alternative embodiment of the invention in the form of a concrete building wall which is both lighter in weight and superior in insulation value to conventional concrete. This building wall comprises a porous concrete wall 40 having central core 41 of the above-described permeable concrete, coated on either side with layers 42 and 43, respectively, of impermeable material such as mortar cement, plaster, epoxy or the like to seal the pores at the surface and trap air voids 44 within the wall. This trapped air, combined with the small area of contact between adjacent coarse aggregate elements (see FIG. 2) produces a lightweight wall of superior insulating characteristics as compared to conventional concrete walls.

The preferred composition for this application is the 2½ bag mixture described hereinabove.

While the invention has been described in connection with but a small number of specific embodiments, it is to be understood that these are merely illustrative of the many other specific embodiments which can also utilize the principles of the invention. Thus, numerous and varied structures can be made by those skilled in the art without departing from the spirit and scope of the present invention.

What is claimed is:

1. In a concrete roadway of the type comprising an elongated structure of concrete having a thickness, width and generally flat upper surface for accommodating and supporting vehicular traffic, the improvement wherein said roadway comprises a monolithic structure of water-permeable concrete comprising:

plural elements of coarse aggregate each having a size in the range of ⅛ to ¼ of an inch, each cubic yard of aggregate elements having been sized in an aqueous suspension of 15 to 22 pounds of silicon dioxide of no greater than 100 mesh in 16 to 22 gallons of water; and between 384 and 480 pounds of cement for each cubic yard of sized aggregate elements, the elements of coarse aggregate being cemented together at points of contact by a layer of cement to provide a plurality of voids between adjacent ones of said elements of aggregate.

2. The roadway of claim 1 wherein said roadway has a plurality of integral underlying longitudinally extending drainage elements of enlarged thickness for draining water.

3. The roadway of claim 2 wherein said integral drainage elements have a thickness at least 50% greater than the average thickness of the remaining areas.

4. The roadway of claim 2 wherein said plurality of drainage elements comprises a pair of drainage elements extending along either edge of said raodway.

5. The roadway of claim 2 wherein the width of said plurality of drainage elements is approximately one-third that of said roadway.

6. The roadway of claim 1 or 2 wherein said generally flat upper surface is substantially planar.

7. The roadway of claim 1 or 2 further comprising an integral center divider.

8. The roadway of claim 1 or 2 wherein said concrete has a water permeability in excess of about ½ inch per minute per unit area.

9. In a large concrete structure, such as a parking lot or playing field base of the type comprising a large area structure of concrete having thickness and generally flat upper surface for supporting human and vehicular traffic, the improvement wherein said structure comprises a monolithic structure of water-permeable concrete comprising:

plural elements of coarse aggregate each having a size in the range of ⅛ to ¼ of an inch, each cubic yard of aggregate elements having been sized in an aqueous suspension of 10 to 15 pounds of silicon dioxide of no greater than 100 mesh in about 12 gallons of water; and about 240 pounds of cement for each cubic yard of sized aggregate elements, the elements of coarse aggregate being cemented together at points of contact by a layer of said cement to provide a plurality of voids between adjacent ones of said aggregate.

10. The concrete structure of claim 9 further comprising an underlying grid of integral drainage elements of enlarged thickness for draining water.

11. The concrete structure of claim 10 wherein said integral drainage elements have a thickness at least twice the average thickness of the remaining areas.

12. The concrete structure of claim 9 or 10 wherein said concrete has a water permeability in excess of about ½ inch per minute per unit area.

* * * * *

UNITED STATES PATENT AND TRADEMARK OFFICE
CERTIFICATE OF CORRECTION

PATENT NO. : 4,376,595
DATED : March 15, 1983
INVENTOR(S) : Arthur Shaw

It is certified that error appears in the above—identified patent and that said Letters Patent is hereby corrected as shown below:

Abstract, line 6, "structure" should read --structures--.

Column 3, line 22, "usful" should read --useful--.

Column 3, line 23, "artifiial" should read --artificial--.

Column 3, line 25, "uper" should read --upper--.

Column 3, line 26, "vehicula" should read --vehicular--.

Signed and Sealed this

First Day of January 1985

[SEAL]

Attest:

Attesting Officer

GERALD J. MOSSINGHOFF

*Commissioner of Patents and Trademarks*